No. 785,223. PATENTED MAR. 21, 1905.
E. M. & J. E. KRAMER.
COMBINED PLOW AND HARROW.
APPLICATION FILED JULY 20, 1904.
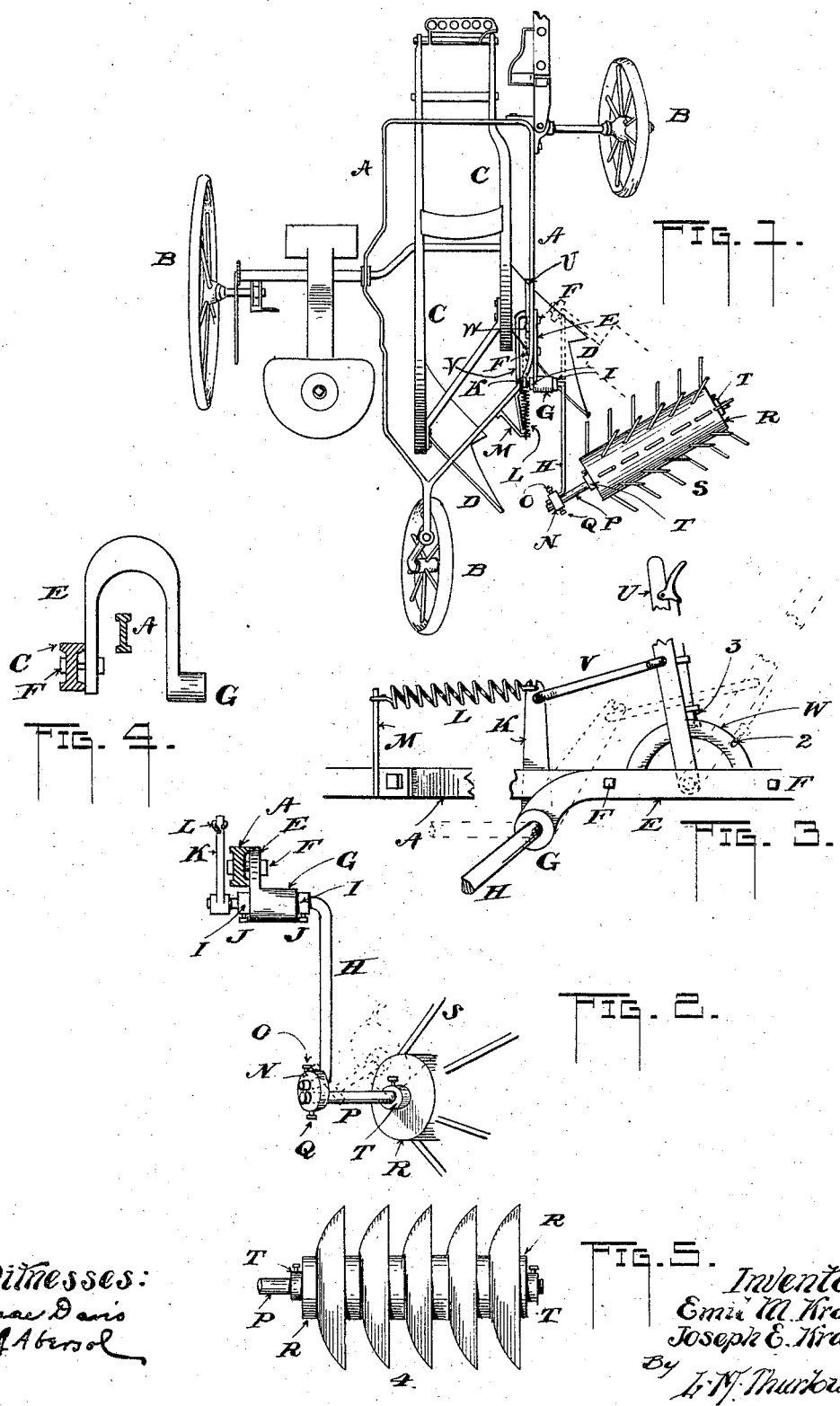
Witnesses:
Mae Davis
E. J. Abersol
Inventors
Emil M. Kramer,
Joseph E. Kramer,
By L. N. Thurlow
Atty.

No. 785,223. Patented March 21, 1905.

UNITED STATES PATENT OFFICE.

EMIL M. KRAMER, OF CISSNAPARK, AND JOSEPH E. KRAMER, OF PEORIA, ILLINOIS.

COMBINED PLOW AND HARROW.

SPECIFICATION forming part of Letters Patent No. 785,223, dated March 21, 1905.

Application filed July 20, 1904. Serial No. 217,343.

*To all whom it may concern:*

Be it known that we, EMIL M. KRAMER, residing at Cissnapark, in the county of Iroquois, and JOSEPH E. KRAMER, residing at Peoria, in the county of Peoria, State of Illinois, citizens of the United States, have invented certain new and useful Improvements in a Combined Plow and Harrow; and we do hereby declare that the following is a full, clear, and exact description of the invention, which will enable others skilled in the art to which it appertains to make and use the same.

This invention relates to a combined plow and harrow, and has for its object, as may be inferred, the attaching of a device for harrowing the ground that has been opened by the plow to the plow-frame.

It is quite well known that certain soils when opened by the plow are baked by the sun in an hour or two to such an extent that it is impossible to harrow on account of the large chunks of baked dirt, and often it becomes necessary to await a rain to soften the soil before it can be gone over. It is our intention in view of this difficulty to provide a harrowing attachment for a plow that will pulverize the soil at once and by one operation, so that the soil will be ready for planting after the plowing is done.

To the end that our device may be readily and completely understood we have provided the accompanying drawings, in which—

Figure 1 is a top view of a common gang-plow, showing our harrow attachment carried thereon. Fig. 2 is a rear elevation of a portion of the plow-frame in cross-section, showing the harrow attachment thereon. Fig. 3 is a side elevation of a portion of the plow-frame, showing part of the harrow attachment with a lever arrangement for raising the harrowing member from the ground when not needed. Fig. 4 is a cross-section of portions of the plow-frame and plow-beam, showing a modified form of arm for carrying the harrowing member. Fig. 5 is a modified form of harrowing member, showing concave disks in lieu of pins or spikes, as shown in Fig. 1.

The plow-frame is represented in Fig. 1, being denoted by the letter A. The letter B indicates the usual wheels for supporting and carrying the same.

C C are the plow-beams, and D D the plowshares.

We attach no importance or claim to the plow itself, as any form of that implement may be used; but we turn our attention to the harrow attachment shown in connection therewith.

E is an arm secured by bolts F or other good means to the frame A. The free end of the said arm is provided with an enlargement G, bored at right angles to the length of the arm to receive a rock-arm H, bent at right angles to that portion having a bearing within the said enlargement G, as shown, and designed to approach the ground when in its operating position. At each side of the portion G the arm H is provided with a collar I, being secured by means of set-screws J, as shown. However, any other good means for holding the arm in place may be resorted to, as we do not wish to confine ourselves to the exact members shown. At K is an upright arm secured to the inner journaled end of the said arm H, a spring L being connected therewith and to a bracket M on the plow-frame, substantially as shown.

On the lower free end of the arm H is a collar N, secured in place by means of a set-screw O. A shaft P is secured in the collar by means of a set-screw Q, the free extremity of said shaft carrying a revoluble cylinder R, provided with a series of teeth or spikes S, positioned about the periphery of the said cylinder about as shown. The end of the arm H to which the collar N is secured is bent at an angle, so that the shaft P is angled forward, the outer end of the cylinder R being ahead of the inner end, as illustrated. Collars T on the shaft P serve to hold the cylinder in a fixed position on the shaft, but allowing it to revolve freely. Other means of securing the shaft to the arm H may be used or the shaft and arm may be formed in one piece, as desired. Means may also be provided for various adjustments of the cylinder to place it at various angles to the line of draft—as, for instance, as shown in Fig. 2 in broken lines, the collar N being slipped toward the bend in the arm H. Various results can of course be had in this way, as far as handling the ground is concerned. The office of the spring L is to normally keep the spikes S of the cylinder R in engagement with the ground by a yielding pressure.

When the harrowing attachment is not in use, the spring L may be disengaged from the arm K and the cylinder R raised and thrown over to the broken-line position illustrated in Fig. 1, the arm K resting upon the frame A or some suitable stop therefor, which, however, is not shown, as we attach no importance thereto. In Fig. 3 we show a lever U carried on the frame A, there being a rod V connecting said lever with the arm K. A sector W is provided, having a notch at 2, into which a latch 3 of the lever may fall. This arrangement is provided in order that the cylinder R may be raised from the ground when not in use; but we wish it understood that we shall not necessarily use this arrangement.

In order to show that we do not wish to confine ourselves to any particular means for securing the harrow device to the plow nor to any stated means of raising it out of its operating position, we show in Fig. 4 a modified form of the arm E. It is bent in the form of an inverted U, its inner end having rigid connection with the plow-beam C. By means of this form of the arm the harrow will be lifted from the ground simultaneous with the removal of the plows from the furrow, as will be understood. As regards the cylinder R, we show in Fig. 5 a series of concave disks 4 to take the place of the spokes S, if desired. In some soils it may be found of advantage to employ this form of harrowing means, and one may be substituted for the other at will.

As placed upon the plow the harrowing-cylinder R traverses the ground just turned by the outside plow; but it can be set out farther from the frame A, so as to work the ground broken at the last round of the plow, if desired, or the cylinder can be made longer, so as to pass over that ground as well as the portion being turned. It is preferable to incline the cylinder forward, as shown; but it may be placed at the opposite angle, and the teeth may likewise be altered in position, so as to obtain the best results. As placed in the drawings the teeth or spikes S break and tear the lumps of dirt and tend to throw the material outward away from the plows. The tension of the spring is sufficient to force the spikes into the clods of dirt and insure a thorough breaking thereof. However, the lever U may be used to hold the cylinder at a fixed point, so that the spikes are made to enter by the weight of the plow. In such case it is only necessary to cut a notch in the sector W just beneath the latch, as shown in Fig. 3, so that the arm H will be held rigid.

Other changes and modifications may be resorted to without sacrificing the spirit of my invention.

In providing our harrow attachment the farmer need not go over his land after it is plowed, since the harrow reduces the dirt to the desired fineness and levels it perfectly. There is therefore no necessity of doing extra work when it can be accomplished in one operation, the harrowing being completed when the furrows are all turned.

We claim—

In a riding-plow, the frame and wheels thereof, a rock-arm journaled on the frame and adapted to be raised and lowered, a harrowing member carried at the free end of the arm at an acute angle to the line of movement of the plow, a hand-lever pivoted on the plow-frame for raising and lowering the rock-arm and its harrowing member, a spring connected at one end with the rock-arm and at the other to the plow-frame for yieldingly holding the harrowing member in contact with the ground, a notched sector in the vicinity of the hand-lever and a spring-catch on the lever for engaging the sector substantially as set forth.

In testimony whereof we affix our signatures in presence of two witnesses.

EMIL M. KRAMER.
JOSEPH E. KRAMER.

Witnesses as to signature of Emil M. Kramer:
C. C. AMSLER,
G. R. STOLLER.

Witnesses as to signature of Joseph E. Kramer:
E. J. ABERSOL,
MAE DAVIS.